United States Patent Office 2,939,794
Patented June 7, 1960

2,939,794
COATING COMPOSITIONS AND COATED STRUCTURES

Clarence E. Wilkinson, Port Neches, Tex., assignor to Texaco Inc., a corporation of Delaware No Drawing. Filed Jan. 28, 1958, Ser. No. 711,553

14 Claims. (Cl. 106—15)

This invention is concerned with a novel asphaltic composition and method for protecting and preserving wooden structures such as utility poles, railroad ties, bridge timbers, and marine pier piles against the ravages of moisture, weather and particularly, fire. In addition, the invention covers the production of the novel composition and also wooden structures coated therewith.

It is well known that wooden structures are especially prone to severe damage and destruction by fire and to disintegration by moisture and weathering. A specific example of such structures are wooden utility poles located in the vast swampland area of the States bordering the Gulf of Mexico. These poles are often subjected to swamp grass fires, violent changes in weather and tidal action. The cost of replacement and repair is substantial and it is, therefore, essential that they be preserved by a low cost yet effective means.

I have discovered a superior asphaltic coating composition which, in addition to having outstanding fire resistant properties (upon curing), has the following desirable attributes:

(1) Low cost.
(2) Ready penetration of wood fibre.
(3) Strong adherence to wood surfaces even at moderately high temperatures.
(4) Moisture and weather resistance.
(5) Resistant to blistering and cracking.
(6) A consistency which allows application by painting or spraying at moderate atmospheric temperatures without substantial sagging of the resultant coating.

The composition of the invention includes a suitable asphalt base cut back with a volatilizable diluent such as a light hydrocarbon distillate. Specific examples of such a diluent are kerosene and naphtha. The composition also includes a combination of inorganic fillers consisting essentially of fine asbestos fibres, fine mica, fine vermiculite and a fine alkali metal tetraborate. Since vermiculite has the property of substantial expansion when heated, vermiculite which has been previously expanded by exposure to high temperatures is preferably used in my novel composition. The use of expanded vermiculite prevents the possibility of change in particle size of the vermiculite component when my novel coating material is subjected to extreme heat such as by exposure to fire. I include within the definition of the tetraborate ingredient the hydrous as well as the anhydrous forms thereof. Specific examples of the borates contemplated herein are sodium tetraborate, sodium tetraborate decahydrate and potassium tetraborate.

The novel filler combination imparts unexpectedly superior fire resistant properties to the asphalt cutback compared to other inorganic filler combinations. Demonstration of this fact is found in subsequent examples.

The novel composition is applied by trowel, brush or preferably sprayed on the wooden structure with a spray gun. A good thick coating is desirably applied such as ⅛ to ¼ inch in thickness. The coatings are self-curing in that in several weeks' time under atmospheric conditions the volatilizable diluent component will evaporate off. The wooden structures may be coated with a novel composition before or after being fixed in a permanent position. In addition, the wooden structures may be entirely coated or just those portions for which protection is desired. For example, in the case of utility poles in their permanent position, it is generally preferable to coat the pole from a point two to three feet below the earth surface to a point 8 to 10 feet above said surface. Such a coated area will normally extend above the optimum height of grass fire flames and below the penetration depth of the earth surface water.

The asphalt component of the protective composition consists of a good coating asphalt such as an asphalt prepared from a paraffinic-asphaltic crude petroleum residuum by steam, vacuum distillation and/or air blowing. Examples of suitable asphalts are ones having a softening point of about 100–180° F. ball and ring, a penetration at 77° F. under a 100 gram load of about 30 to 70 and a solubility in carbon tetrachloride of at least 99.5%.

The asphalt is heated to fluidity and mixed, preferably by stirring, with a volatilizable diluent to form the asphalt cutback. The proportion of the asphalt cutback in the total composition is preferably about 60 to 70%. The amount of asphalt and volatilizable diluent comprising the cutback will vary depending upon the consistency of the cutback desired. Preferably the proportions of asphalt and volatilizable diluent are adjusted to form an asphalt cutback having a viscosity of about 75 to 150 seconds, Saybolt Furol at 122° F. (75 to 150 SF/122° F.). Ordinarily the proportions of asphalt and diluent in the novel composition of this invention approximate 35 to 55% asphalt and 15 to 30% diluent.

The cutback is heated and mixed, preferably by stirring, with the fine inorganic filler combination consisting essentially of asbestos, mica, vermiculite and an alkali metal tetraborate. The total inorganic filler content should ordinarily be within the range of about 30 to 40% of the total composition. The individual components of the inorganic filler should generally be within the range of about 5 to 15% asbestos fibre, about 5 to 10% mica, about 5 to 15% vermiculite and about 2 to 8% of the borate. By the term "fine" I mean materials which will substantially all pass a No. 12 mesh U.S. standard screen.

As heretofore disclosed my novel composition, when applied to a wooden structure and allowed to naturally cure for several weeks' time, will lose its volatilizable diluent component through evaporation. Therefore, my preferred coating composition consisting essentially of about 30 to 55% asphalt, about 15 to 30% volatilizable diluent, about 5 to 15% asbestos fibre, about 5 to 10% mica, about 5 to 15% vermiculite, and about 2 to 8% alkali metal tetraborate and wherein the asphalt and diluent comprise about 60 to 70% of the composition, is converted upon curing to a composition consisting essentially of about 43 to 65% asphalt, about 6 to 21% asbestos fibre, about 6 to 14% mica, about 6 to 21% vermiculite and about 2 to 11% alkali metal tetraborate.

All of the compositions in the subsequent examples were prepared by sifting the particular pre-blended inorganic filler combinations into the asphalt cutback (asphalt+naphthenic distillate) heated to a temperature between 100 and 120° F. while stirring at 70 r.p.m. in a 2½ gallon motor driven dough mixer. After all the filler had been added to the cutback, stirring was continued for a period of 10 minutes. In the preparation of the composition described in subsequent Example IV, the aluminum pigment was dispersed in the cutback before the inorganic fillers were added.

Although the individual inorganic filler components in the preparation of the example compositions were added to the cutback simultaneously, they may be individually mixed with the cutback. Also, in the large scale production of my novel composition grease type mixing kettles are used which are equipped with baffles and paddle type stirrers operating at 15 to 20 r.p.m. Stirring in the commercial operation is continued for about 45 minutes after all the fillers have been added.

A sieve analysis of the particular fine asbestos and expanded vermiculite used in the example compositions was as follows:

| Asbestos | | Vermiculite (Expanded) | |
|---|---|---|---|
| Screen [1] | Wt., Percent | Screen [1] | Wt., Percent |
| Retained on No. 12 | 0.0 | Retained on No. 20 | 3.6 |
| Passing No. 12 and Retained on No. 20 | 4.8 | Passing No. 20 and Retained on No. 40 | 57.3 |
| Passing No. 20 and Retained on No. 40 | 39.8 | Passing No. 40 and Retained on No. 70 | 21.6 |
| Passing No. 40 and Retained on No. 70 | 22.0 | Passing No. 70 and Retained on No. 100 | 6.9 |
| Passing No. 70 and Retained on No. 140 | 6.8 | Passing No. 100 and Retained on No. 200 | 6.7 |
| Passing No. 140 and Retained on No. 200 | 1.8 | Passing No. 200 | 3.9 |
| Passing No. 200 | 24.8 | | |

[1] U.S. standard.

A sieve analysis of the other inorganic fillers, i.e., aluminum pigment, mica, oyster shell, sodium tetraborate decahydrate (borax) and zinc borate, found the mica passing a No. 270 screen (U.S. standard) in a 100% quantity and the remaining fillers entirely passing a No. 100 screen.

The volatilizable diluent employed was a straight run naphthenic petroleum distillate having a boiling range between 300–400° F.

The asphalt component employed was a vacuum steam distilled paraffinic-asphalted petroleum residuum having a penetration at 77° F. under a 100 gram load of 55 and and a 126° F. ring and ball softening point.

The asphalt cutback (asphalt+naphthenic distillate) in all of the example compositions had a viscosity of 113 to 115 SF/122° F.

In each of the following five examples a wooden utility pole was placed in a vertical position and secured by burying a portion thereof in the ground. The asphaltic composition was then sprayed on the section of the utility pole to a thickness of about ⅛ inch beginning at a point at the ground level and extending 8 feet up the pole. The coating was allowed to cure for three weeks. Then two concentric cylinders of 3 x 3 inch mesh reinforcing wire were placed around the pole so that there was a 3 inch wide annular space between the pole and the inner cylinder and a 10 inch wide annular space between inner and outer cylinders. The cylinders extended from the ground level to a point 5 feet up the pole. Marsh hay was packed into the 10 inch annular space in a manner to completely fill said space. The hay was ignited on the windward side of the pole. After allowing the hay to burn for a period of 5 minutes, the outer cylinder was removed from each pole and the burning hay remaining at the base of the pole was removed. Twenty-four hours later, the coated pole was again subjected to fire in the manner just described. The condition of the coated pole was recorded and the asphaltic composition was rated from 1 to 5, the 1 rating being for the best fire resistance and the 5 rating for the poorest. In Example I, a representative of our novel composition was tested and received a rating of 1. In Examples II to IV, other filled asphaltic compositions tested for comparison received a 3 and poorer ratings. In Example V, the pole was not coated and, therefore, was not given a particular rating.

*Example I*

Original coating composition:

| Ingredients— | Wt., Percent |
|---|---|
| Asphalt | 43.5 |
| Naphthenic distillate | 21.5 |
| Asbestos fibre | 10 |
| Mica | 10 |
| Vermiculite (expanded) | 10 |
| Borax | 5 |

Fire test observations: The coating was slightly cracked at two places near the base but did not pull away from the pole. The coating did not ignite and retained its pliability over the entire exposed surface. There was no charring of the pole itself except for two small spots having a total area of about 4 x 6 inches. Rating: 1.

*Example II*

Original coating composition:

| Ingredients— | Wt., Percent |
|---|---|
| Asphalt | 43.5 |
| Naphthenic distillate | 21.5 |
| Asbestos fibre | 10 |
| Oyster shell | 10 |
| Vermiculite (expanded) | 10 |
| Borax | 5 |

Fire test observations: The coating ignited, crusted over and cracked in several places. A portion of the crust about 3 feet long broke away from the base of the pole. The exposed area of the coating charred to a depth of ¼ to ½ inch. The pole ignited under the charred coating and continued to smolder after the flames had subsided. Rating: 3.

*Example III*

Original coating composition:

| Ingredients— | Wt., percent |
|---|---|
| Asphalt | 46.9 |
| Naphthenic distillate | 23.1 |
| Asbestos fibre | 15 |
| Oyster shell | 10 |
| Borax | 5 |

Fire test observations: The coating ignited and burned furiously near base. The pole ignited under the flaming coating and continued to smolder several minutes after the burning hay was removed at the end of the 5 minute period. The pole charred to a ½ inch depth in many places. Rating: 4.

*Example IV*

Original coating composition:

| Ingredients— | Wt., percent |
|---|---|
| Asphalt | 46.9 |
| Naphthenic distillate | 23.1 |
| Asbestos fibre | 15 |
| Vermiculite (expanded) | 5 |
| Aluminum pigment | 10 |

Fire test observations: The coating ignited, charred and cracked badly in areas exposed to flame. A large portion of the charred coating broke away from the pole. The pole itself was badly charred. Rating: 5.

*Example V*

Original coating composition: None.

Fire test observations: The pole ignited and continued to flame as long as the hay was burning. The pole continued to smolder for some time after the burning hay was raked away and was badly charred. Rating: None.

In another fire test three additional comparative asphaltic compositions were tested. The second fire test series was substantially less severe than the fire test conducted on the coatings in Examples I to IV in that the coatings were subjected to only one firing. Even under these less severe conditions, the comparative compositions resisted fire less effectively than our novel composition representative in Example I.

In each of the three additional runs in the second fire test series a wooden utility pole was placed in a vertical position and secured by burying a part thereof in the ground. The asphaltic composition was applied by trowel on the section of the utility pole to a thickness of ⅛ to 3/16 inch at a point beginning at ground level and extending approximately 7 feet thereabove. The coating was allowed to cure for eight weeks. At the end of that period, marsh hay was stacked around the coated pole up to a height of 7 feet. Strings were tied around the stack to hold it in place. The hay was then ignited at a point 2 feet from the top of the stack on the windward side. Flame duration was about six minutes.

The asphaltic compositions tested and the results of the second fire test series are described in the following three examples.

*Example VI*

Original coating composition:

| Ingredients— | Wt., percent |
| --- | --- |
| Asphalt | 46.9 |
| Naphthenic distillate | 23.1 |
| Asbestos fibre | 15 |
| Mica | 10 |
| Borax | 5 |

Fire test observations: Coating crusted over, charred and displayed numerous cracks. Rating: 2.

*Example VII*

Original coating composition:

| Ingredients— | Wt., percent |
| --- | --- |
| Asphalt | 50.3 |
| Naphthenic distillate | 24.7 |
| Asbestos fibre | 15 |
| Oyster shell | 5 |
| Vermiculite (expanded) | 5 |

Fire test observations: Coating charred and puffed up. Rating: 2.

*Example VIII*

Original coating composition:

| Ingredients— | Wt., percent |
| --- | --- |
| Asphalt | 46.9 |
| Naphthenic distillate | 23.1 |
| Asbestos fibre | 15 |
| Oyster shell | 10 |
| Zinc borate | 5 |

Fire test observations: The coating sloughed off the pole from top to bottom on the leeward side. Rating: 4.

As can be seen from a review of Examples I to VIII, my novel composition, represented by the composition in Example I, is substantially superior as to fire resistance than the comparative compositions found in Examples II to IV and VI to VIII. This remarkable fire resistant property of my novel composition is attributed to the synergistic action of the particular filler combination of asbestos, mica, vermiculite and an alkali metal tetraborate in resisting extreme temperatures.

In other tests conducted on poles covered with my novel composition, the coating did not crack or blister after long periods of weathering and the sections beneath the coatings remained moisture free even below the ground level.

In addition to the foregoing disclosure, there may be incorporated in my novel composition a toxic amount of a fungitoxic compound such as copper-8-quinolinolate and copper naphthenate. The addition of a fungitoxic compound will further insure the protection of the wooden structures against fungus and bacterial attack. Any amount of a fungitoxic compound will aid in affording protection. However, the preferred quantities have been found to be in the range of about 0.9 to 5% of the total composition (about 0.1 to 7% based on the cured composition). In the preparation of my novel composition containing a fungitoxic compound, the fungitoxic compound is preferably added to the asphalt cutback with mixing during the addition of the inorganic fillers thereto. A specific example of my novel composition including a fungitoxic agent is as follows:

| Ingredients— | Wt., percent |
| --- | --- |
| Asphalt | 43.5 |
| Naphthenic distillate | 21.5 |
| Asbestos fibre | 9.9 |
| Mica | 10 |
| Vermiculite (expanded) | 10 |
| Borax | 5 |
| Copper-8-quinolinolate | 0.1 |

All percentages expressed in the specification and claims are based on weight unless otherwise described.

Obviously, many modifications and variations of the invention as hereinbefore set forth may be made without departing from the spirit and scope thereof, and therefore, only such limitations should be imposed as are indicated in the appended claims.

I claim:

1. A fire resistant coating composition consisting essentially of about 30–55% asphalt, about 15–30% volatilizable diluent, about 5–15% fine asbestos, about 5–10% fine mica, about 5–15% fine expanded vermiculite and about 2–8% fine alkali metal tetraborate.

2. A composition in accordance with claim 1 wherein said composition also includes a toxic amount of a fungitoxic compound.

3. A fire resistant coating composition consisting essentially of about 43.5% asphalt, about 21.5% naphthenic distillate, about 10% fine asbestos, about 10% fine mica, about 10% fine expanded vermiculite and about 5% fine borax.

4. A method of producing a protective coating composition comprising mixing asphalt with volatilizable diluent to form an asphalt cutback, mixing with said cutback a fine inorganic filler composition consisting essentially of asbestos, mica, expanded vermiculite and an alkali metal tetraborate while adjusting the individual ingredient amounts of said composition to form a composition consisting essentially of about 30–55% of said asphalt, about 15–30% of said volatilizable diluent, about 5–15% of said asbestos, about 5–10% of said mica, about 5–15% of said vermiculite and about 2–8% of said tetraborate.

5. A method in accordance with claim 4 wherein a toxic amount of a fungitoxic compound is also incorporated in said asphalt cutback and mixed therewith.

6. A method in accordance with claim 4 wherein the amount of the individual ingredients of said composition are adjusted to form a composition consisting essentially of about 43.5% of said asphalt, about 21.5% of said volatilizable diluent, about 10% of said asbestos, about 10% of said mica, about 10% of said vermiculite and about 5% of said tetraborate and wherein said volatilizable diluent is naphthenic distillate and said tetraborate is borax.

7. An article of manufacture comprising a wooden structure having the surface thereof coated with an asphaltic composition which upon initial application to said surface consists essentially of about 30–55% asphalt, about 15–30% volatilizable diluent, about 5–15% fine asbestos, about 5–10% fine mica, about 5–15% fine expanded vermiculite and about 2–8% fine alkali metal tetraborate.

8. An article of manufacture in accordance with claim 7 wherein said composition also includes a toxic amount of a fungitoxic compound.

9. An article of manufacture in accordance with claim 7 wherein said composition upon said initial application consists essentially of about 43.5% of said asphalt, about 21.5% of said volatilizable diluent, about 10% of said asbestos, about 10% of said mica, about 10% of said vermiculite and about 5% of said tetraborate and wherein said diluent is naphthenic distillate and said tetraborate is borax.

10. A method of protecting a wooden structure against fire, moisture and weather comprising coating said structure with an asphaltic composition consisting essentially of about 30–55% asphalt, about 15–30% volatilizable diluent, about 5–15% fine asbestos, about 5–10% fine mica, about 5–15% fine expanded vermiculite and about 2–8% of fine alkali metal tetraborate.

11. A method in accordance with claim 10 wherein said composition also includes a toxic amount of a fungitoxic compound.

12. A method in accordance with claim 10 wherein said asphaltic composition consists essentially of about 43.5% of said asphalt, about 21.5% of said diluent, about 10% of said asbestos, about 10% of said mica, about 10% of said vermiculite and about 5% of said tetraborate and wherein said diluent is naphthenic distillate and said tetraborate is borax.

13. An article of manufacture comprising a wooden structure having a surface thereof coated with a cured coating composition, said composition consisting essentially of about 43–65% asphalt, about 6–21% fine asbestos, about 6–14% fine mica, about 6–21% fine expanded vermiculite and about 2–11% fine alkali metal tetraborate.

14. An article of manufacture in accordance with claim 13 wherein said composition also includes a toxic amount of a fungitoxic compound.

References Cited in the file of this patent

UNITED STATES PATENTS

| | | |
|---|---|---|
| 2,569,399 | Burns et al. | Sept. 25, 1951 |
| 2,738,286 | Greider et al. | Mar. 13, 1956 |
| 2,769,729 | Van de Zande | Nov. 6, 1956 |